US012121905B2

(12) United States Patent
Van Beers

(10) Patent No.: US 12,121,905 B2
(45) Date of Patent: Oct. 22, 2024

(54) METHOD TO OPERATE A GRINDER DURING PRODUCTION

(71) Applicant: GEA Food Solutions Bakel B.V., Bakel (NL)

(72) Inventor: Harrie Van Beers, JN Budel (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 114 days.

(21) Appl. No.: 17/867,938

(22) Filed: Jul. 19, 2022

(65) Prior Publication Data

US 2022/0355308 A1 Nov. 10, 2022

Related U.S. Application Data

(63) Continuation of application No. 16/620,566, filed as application No. PCT/EP2018/068780 on Jul. 11, 2018, now Pat. No. 11,504,720.

(30) Foreign Application Priority Data

Jul. 27, 2017 (EP) .................................... 17183422

(51) Int. Cl.
*B02C 18/30* (2006.01)
*B02C 18/22* (2006.01)
*B02C 18/38* (2006.01)

(52) U.S. Cl.
CPC .......... *B02C 18/38* (2013.01); *B02C 18/2258* (2013.01); *B02C 18/30* (2013.01); *B02C 18/305* (2013.01)

(58) Field of Classification Search
CPC ..... B02C 18/38; B02C 18/2258; B02C 18/30; B02C 18/305; B02C 25/00
See application file for complete search history.

(56) References Cited

U.S. PATENT DOCUMENTS 3,310,086 A 3/1967 Lasar
3,984,056 A 10/1976 Hartley
(Continued)

FOREIGN PATENT DOCUMENTS

CN 1080215 A 3/2002
CN 1525932 A 9/2004
(Continued)

OTHER PUBLICATIONS

International Search Report and Written Opinion for International Application PCT/EP2018/068780; dated Sep. 17, 2018.
(Continued)

*Primary Examiner* — Faye Francis
(74) *Attorney, Agent, or Firm* — The Dobrusin Law Firm P.C.

(57) ABSTRACT

The present invention relates to a method to grind mass in a grinder (1) wherein the mass is provided to the grinder (1) via a hopper (5) and transported by a feeder worm (2) to a rotating processing worm (3) which conveys the mass towards a cutting set (4) which grinds the mass and wherein the feeder worm (2) initially rotates in a first direction. During production the feeder worm (2) is periodically reversed and/or the speed of rotation of the feeder worm (2) is reduced in case the volume between the feeder worm (2) and the processing worm (3) tends to get blocked with the mass.

8 Claims, 1 Drawing Sheet

(56) References Cited

U.S. PATENT DOCUMENTS

| | | | |
|---|---|---|---|
| 5,230,475 | A | 7/1993 | Gerner |
| 6,092,854 | A | 7/2000 | Campbell |
| 6,405,662 | B1 | 6/2002 | Williams et al. |
| 7,080,798 | B2 | 7/2006 | Kofoed |
| 7,383,842 | B1 | 6/2008 | Sabol et al. |
| 11,014,091 | B2 | 5/2021 | Voesten et al. |
| 2018/0185852 | A1 | 7/2018 | Voesten et al. |
| 2018/0257268 | A1 | 9/2018 | Brzezowsky et al. |
| 2019/0152712 | A1 | 5/2019 | Sollner |

FOREIGN PATENT DOCUMENTS

| | | | | |
|---|---|---|---|---|
| CN | 201179470 | Y | 1/2009 | |
| CN | 102182085 | A | 9/2011 | |
| CN | 202516608 | U | 11/2012 | |
| CN | 205567636 | U | 9/2016 | |
| DE | 728318 | C | 11/1942 | |
| DE | 2812536 | A1 | 9/1979 | |
| DE | 9104544 | U1 | 6/1991 | |
| DE | 19508093 | A1 * | 9/1996 | ............. B02C 18/30 |
| DE | 202006001147 | U1 | 6/2006 | |
| EP | 0573759 | B1 | 7/1997 | |
| GB | 2268097 | A | 1/1994 | |
| JP | 2000-093925 | A | 4/2000 | |
| JP | 6115868 | B2 | 4/2017 | |
| WO | 2017/009282 | A1 | 1/2017 | |

OTHER PUBLICATIONS

International Preliminary Report on Patentability for International Application PCT/EP2018/068780; dated Nov. 14, 2019.

* cited by examiner

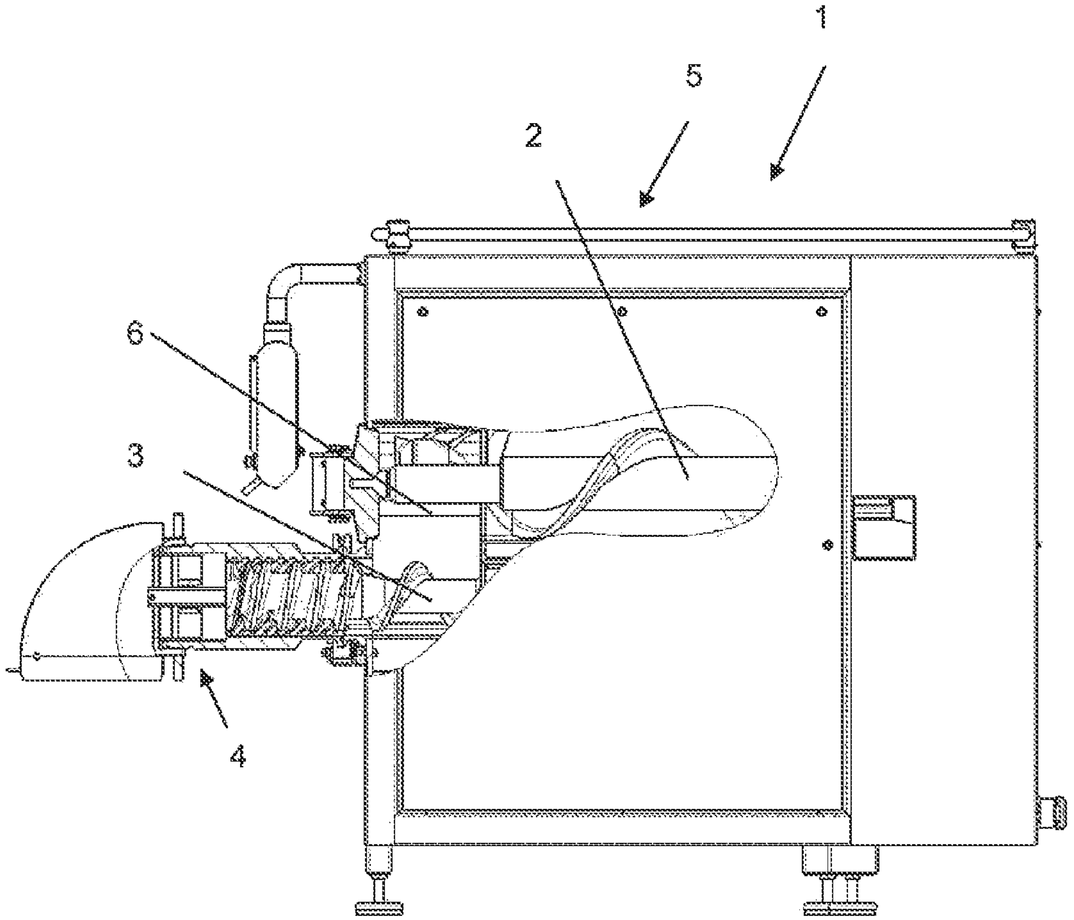
1
5
2
6
3
4

METHOD TO OPERATE A GRINDER DURING PRODUCTION

The present invention relates to a method to grind a mass such as meat, vegetables, cheese, butter in a grinder wherein the mass is provided to the grinder via a hopper and transported by a feeder worm to a rotating processing worm which conveys the mass towards a cutting set which grinds the mass and wherein the feeder worm initially rotates in a first direction.

Such grinders are known from the state of the art and are, for example, utilized to produce minced meat. However, there is a constant need to improve the operation of such grinders, for example in terms of operation time, retention of capacity and/or energy consumption, maintenance and/or quality of the resulting product It was therefore the objective of the present invention to provide a method which does not comprise the deficiencies of the state of the art.

This is attained by a method to grind mass in a grinder, wherein the mass is provided to the grinder via a hopper and transported by a feeder worm, to a rotating processing worm, which conveys the mass towards a cutting set which grinds the mass, wherein the feeder worm initially rotates in a first direction, wherein during production, the feeder worm is periodically reversed in its direction of rotation and/or the speed of rotation of the feeder worm is reduced in case the volume between the feeder worm and processing worm tends to get blocked with the mass.

The present invention relates to a method to grind mass in a grinder. The mass can be meat, vegetables or the like. This grinder comprises a hopper which carries the mass to be ground. At the base of the hopper a feeder worm is provided which rotates in a first direction around its middle axis. Additionally, a rotating processing worm is part of the grinder which conveys the mass towards a cutting set, which cuts the mass in pieces so that the resulting product is for example minced meat. The cutting set comprises at least a perforated disk and a rotating knife which is in most cases driven by the processing worm. Preferably, the grinder comprises a stationary, non-rotating pre-cutter.

According to one embodiment of the present invention, during production, the feeder worm is periodically reversed in its direction of rotation. Hence, the feeder worm rotates for a certain period of time in one direction, the first direction, and is then, preferably automatically, reversed to a second direction. This reversion of the direction of rotation of the feeder worm is not initiated by an overload situation as disclosed in the state in the art WO2017/009282A1. The feeder worm then rotates for a certain period of time in this reverse direction, the second direction, and then changes its rotation back to the initial direction, the first direction.

Due to this operation of the grinder, the resulting product is improved in its quality and/or the operation time of the grinder is prolonged.

Preferably the speed of rotation in the first direction is different from the speed of rotation in the second direction.

Preferably, during production under normal conditions, the feeder worm and the processing worm rotate in the same direction, each around their middle axis, respectively. This direction is the first direction of rotation of the feeder worm.

In case the direction of rotation of the feeder worm is reversed to a second direction of rotation, this rotation in the second direction only takes place preferably for a certain period of time and/or a certain number of revolutions for example 0.5-3 revolutions and is then turned back to the initial first direction.

According to a preferred embodiment of the present invention, the feeder worm rotates according to a preset pattern. This pattern preferably comprises the time and/or the revolutions in which the feeder worm rotates in the first direction and the time and/or revolutions in which the feeder worm rotates in the second direction. Preferably the pattern also comprises the speed and/or acceleration of the rotation into the first direction and/or the speed and/or acceleration of the rotation in the second direction.

Preferably, the pattern is part of a recipe, which determines how the respective mass is going to be processed. This recipe can be dependent from the type of mass, in case of meat for example pork, beef, lamb, and/or chicken, and/or its temperature, particularly before grinding, and/or the cutting set which is utilized during grinding and/or the design of the feeder worm and/or the processing worm. In case it is desired, one or more parameters within the recipe can be adjusted during production.

Preferably, the rotation of the feeder worm is controlled by a control unit such as a PLC, which is preferably part of the grinder and/or part of a line.

The above-mentioned recipe can inputted into the control unit or downloaded from a data storage device. The cutting set may comprise an identification, which is automatically or manually inputted into the control unit. Based on this identification, the recipe is downloaded automatically. The cutting set can also comprise a data-storage on which the recipe is stored.

According to a preferred embodiment of the present invention, the processing worm maintains its direction of rotation and/or its speed or its speed pattern of rotation during the entire process, i.e. also during the rotation of the feeder worm in the second direction and/or when the rotation of the feeder worm is stopped.

Preferably, before and after a change of direction of rotation of the feeder worm the speed of rotation of the feeder worm is at least essentially identical.

According to a preferred embodiment of the present invention, the grinder comprises a sensor that measures at least one parameter of the mass and/or the parameter is inputted into the control unit of the grinder and the parameter is utilized to determine the rotation pattern of the feeder worm. This parameter can be the type of mass, its temperature, a mechanical parameter of the mass, such as tenderness, its fat content and/or the particle size of the resulting product.

According to another inventive or preferred embodiment of the present invention, the speed of rotation of the feeder worm is reduced in case the volume between the feeder worm and processing worm tends to get blocked with the mass to be processed. This speed reduction can be only gradual but comprises also a reduction to zero. This reduction is preferably carried out as soon as the density of the mass compresses to an undesired level. This compression can be sensed by a sensor and/or by the power consumption of the feeder worm and/or the processing worm.

The feeder worm is preferably arranged above the processing worm, preferably both at the base of the hopper. The center axis of both worms are preferably in one vertical plane.

Due to the reduction of the speed of the rotational speed of the feeder worm, the mass volume between the feeder worm and the processing worm decompresses which can be detected by a sensor, for example a pressure sensor and/or the power consumption of the feeder worm and/or the processing worm. As soon as the density of the volume between the worms has reached a desired value, the speed of rotation of the feeder worm can be increased again.

The invention is now explained according to the only FIG. 1.

FIG. 1 shows a grinder on which the inventive method can be executed. This grinder comprises a hopper 5, which accommodates the mass to be processed, e.g. blocks of frozen meat. At the bottom of the hopper 5 a feeder worm 2 is provided, which is driven by a motor and rotates during processing in a first direction around its longitudinal axis. Additionally, here below the feeder worm 2, a processing worm 3 is provided, which conveys the mass towards a cutting set 4, but which also comprises means to compress the mass. The cutting set comprises at least a perforated plate and a knife, which is driven by the processing worm and rotates relative to the perforated plate. Due to the cooperation of the perforated plate and the knife, for example minced meat is produced. During normal process conditions the feeder worm and the processing worm transport the mass in the same direction, the rotation direction depends on the design (winding direction) of the worm and/or the feeder worm and the processing worm rotate in the same direction of rotation.

In a first embodiment of the invention the direction of rotation of the feeder worm 2 is reversed for a certain period of time and/or for a certain number of revolutions. Then the feeder worm is stopped again and reversed back to its initial direction of rotation. During this change of direction of rotation of the feeder worm the processing worm preferably maintains its direction of rotation and/or its speed of rotation. After the reversed rotation of the feeder worm, the feeder worm preferably rotates in the same direction and at the same speed as prior to the reversed rotation.

In a second embodiment of the invention the rotational speed of the feeder worm will be reduced, preferably to zero for a certain period of time.

In a third embodiment of the invention both the direction of rotation of the feeder worm and the processing worm remains the same and in order to prevent that volume 6 tends to get blocked with mass, the initial rotational speed of the feeder worm will be reduced relative to the initial rotational speed of the processing worm 3 such that the capacity delivered by the feeder worm will be lower than the capacity delivered by the processing worm. The reduction of rotational speed can start relatively early after a change in one or more relevant parameter(s) is sensed and depending on the sensed value an initial minor reduction of speed can be applied.

Hence, the speed of rotation of the feeder worm is reduced proactively, before an undesired processing situation occurs.

Reverse direction of rotation and/or the control of the rotational speed of the feeder worm can be initiated manually or automatically, for example by means of a sensor prior or after grinding, and/or by a recipe, which determines the treatment of the mass in the grinder. The sensor can sense one parameter of the mass, such as pressure, density, etc. and/or one or more parameters related to the drive of the feeder worm and/or the processing worm such as torque, current, voltage, power, and/or the design of the feeder worm and/or the processing worm. In a more preferred embodiment the entire process of reversing the direction of rotation and/or the control of speed of the feeder worm is controlled automatically based on the measured parameters and preferably related to the course of the measured relevant parameter(s). By relating the control to the course or the measured parameter will result in a gentle control wherein a reverse drive or control of speed only takes place for a short period of time.

REFERENCE SIGNS

1 Grinder
2 feeder worm
3 processing worm
4 cutting set
5 hopper
6 volume between feeder worm and processing worm

The invention claimed is:

1. A method of operating a grinder, the method comprising:

- providing mass to the grinder via a hopper, the mass comprises frozen meat;
- transporting the mass by a feeder worm to a rotating processing worm, which conveys the mass towards a cutting set, the feeder worm is driven by a motor;
- reducing a speed of rotation of the motor of the feeder worm when a volume defined between the feeder worm and the processing worm is blocked with the mass, which occurs when a density of the mass is compressed to a predetermined level, which is sensed by a sensor or by a power consumption of the feeder worm or the processing worm.

2. The method according to claim 1, wherein the density of the mass is decompressed after the step of reducing the speed of rotation of the motor of the feeder worm, which is detected by the sensor or by the power consumption of the feeder worm and/or the processing worm.

3. The method according to claim 2, wherein after the density of the mass is decompressed, which is detected by the sensor or by the power consumption of the feeder worm or the processing worm, then the method comprises increasing the speed of rotation of the motor of the feeder worm.

4. The method according to claim 3, wherein the speed of rotation of the motor of the feeder worm is reduced to zero.

5. The method according to claim 4, wherein the grinder comprises a control unit, and the feeder worm rotates according to a preset pattern, wherein the control unit comprises a data-storage on which the present recipe is stored.

6. The method according to claim 4, wherein the grinder comprises a control unit, and the feeder worm rotates according to a preset pattern, wherein the method comprises inputting an identification into the control unit, and based on the identification the method comprises downloading the preset recipe to the control unit.

7. The method according to claim 6, wherein the feeder worm has a center axis and the processing worm has a center axis, and both of the center axis of the feeder worm and the center axis of the processing worm are in one vertical plane.

8. The method according to claim 1, wherein the speed of rotation of the motor of the feeder worm is reduced to zero.

* * * * *